(12) United States Patent
Sung et al.

(10) Patent No.: US 8,379,557 B2
(45) Date of Patent: Feb. 19, 2013

(54) METHOD AND APPARATUS FOR CONTROLLING SLEEP MODE IN WIRELESS COMMUNICATION NETWORKS

(75) Inventors: Dan Keun Sung, Daejeon (KR); Yunju Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 242 days.

(21) Appl. No.: 12/978,791

(22) Filed: Dec. 27, 2010

(65) Prior Publication Data

US 2011/0158144 A1 Jun. 30, 2011

(30) Foreign Application Priority Data

Dec. 29, 2009 (KR) .................. 10-2009-0132322

(51) Int. Cl.
*H04W 52/02* (2009.01)
(52) U.S. Cl. ..................................... 370/311
(58) Field of Classification Search .......... 370/310–350; 455/510, 517, 522, 524, 525, 571, 573–574
See application file for complete search history.

(56) References Cited

U.S. PATENT DOCUMENTS

2008/0009328 A1* 1/2008 Narasimha ................... 455/574

FOREIGN PATENT DOCUMENTS

| KR | 10-0795564 | 1/2008 |
| KR | 10-2008-0046837 | 5/2008 |
| KR | 10-2009-0079013 | 7/2009 |
| WO | 2008/060033 | 5/2008 |

\* cited by examiner

*Primary Examiner* — Andrew Lai
*Assistant Examiner* — Syed M Bokhari
(74) *Attorney, Agent, or Firm* — Bacon & Thomas, PLLC

(57) ABSTRACT

A method for controlling sleep mode of a base station and a mobile station in wireless communication networks, including: determining N of the N-ary exponential sleep mode to decide a length of sleep duration including a sleep interval; measuring downlink traffic addressed to the mobile station at the beginning of a listening interval right after the sleep interval; and when there exist downlink traffic, confirming whether the measured downlink traffic satisfies a mode transition condition. The method further includes: conducting a sleep interval of the next sleep duration of which the length is determined by multiplying the length of the current sleep duration by N unless the downlink traffic satisfies the mode transition condition; and transmitting the downlink traffic to the mobile station when m times the additional consecutive sleep duration is expired or when the measured amount of the downlink traffic satisfies the mode transition condition.

15 Claims, 6 Drawing Sheets

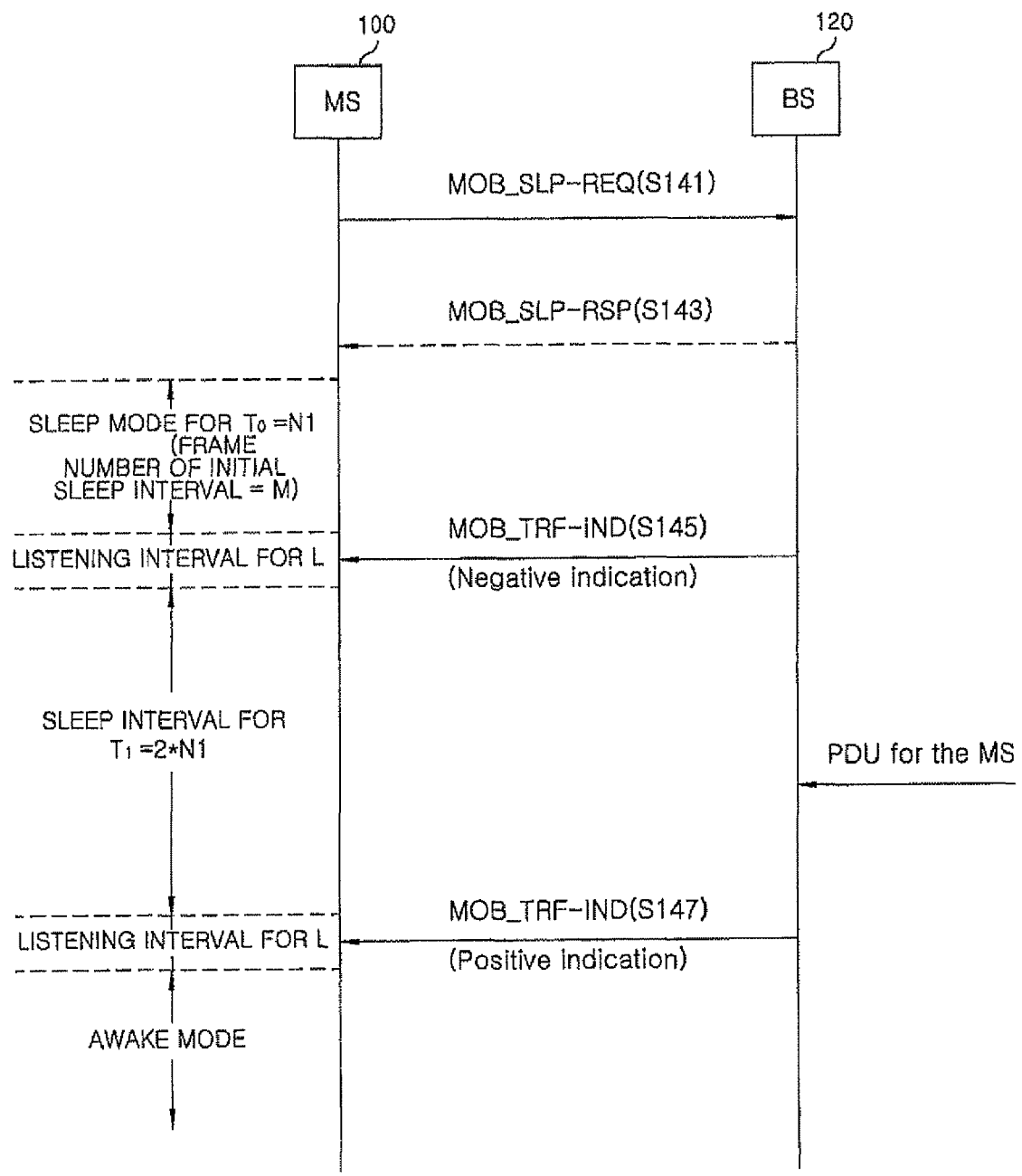

SLEEP —— SLEEP INTERVAL
LISTEN —— LISTENING INTERVAL $C_0$ : INITIAL SLEEP CYCLE
SLEEP —— SLEEP INTERVAL
LISTEN —— LISTENING INTERVAL

METHOD AND APPARATUS FOR CONTROLLING SLEEP MODE IN WIRELESS COMMUNICATION NETWORKS

FIELD OF THE INVENTION

The present invention relates to a method and an apparatus for controlling sleep mode in wireless communication networks; and, more particularly, to a method and an apparatus for maximizing power saving by lengthening sleep duration through adoption of the N-ary exponential sleep mode of a base station and a mobile station in the wireless communication networks.

BACKGROUND OF THE INVENTION

In general, a communication system has been developed to provide high quality service capable of transmitting and receiving massive data at high speeds. In particular, demands for wireless communication network environments have recently increased. Due to a limited battery life of a mobile station (hereinafter, referred to as "MS"), power consumption of the MS is one of the factors significantly affecting overall performance of the wireless communication systems.

Sleep mode of a base station (hereinafter, referred to as "ES") and an MS can be employed to efficiently reduce power consumption of the MS. For example, the IEEE 802.16e standard for communication systems supports sleep mode, which is mandatory for the BS. Further, implementation of sleep mode is optional for the MS according to the IEEE 802.16e standard, however, the MS not supporting sleep mode keeps monitoring the downlink all the time even when it does not receive data from the BS or transmit data to the BS, resulting in high power consumption.

Sleep mode is composed of repetition of a sleep interval and a listening interval. The sleep interval is the time duration when the MS does not receive downlink data for power saving, whereas the listening interval is the time duration when the MS receives instruction for the existence of downlink traffic addressed to the MS. During the sleep interval, the MS may not supply power to some of the physical components and it does not communicate with the BS.

FIG. 1 illustrates the operation for controlling sleep mode in a communication system.

As shown in FIG. 1, an MS 100 transmits a sleep request (MOBSLP-REQ) message to a BS 120 to switch from active mode to sleep mode in step S141. On receiving this MOB_SLP-REQ message, the BS 120 determines whether to approve the switching request of the MS 100 to sleep mode or not, and transmits a sleep response message (MOB_SLP-RSP) depending on the determined result to the MS 100 in step S143. For example, according to the IEEE 802.16e standard, this MOB_SLP-RSP message contains several parameters such as initial-sleep window indicating the length of an initial sleep interval; listening window indicating the length of a listening interval; final-sleep window base indicating a base for a final sleep interval and final-sleep window exponent indicating an exponent for the final sleep interval, which are necessary to determine the maximum length of a sleep interval; and start_frame_number indicating the number of the starting frame of the initial sleep interval. In step S143, the BS 120 may request the MS 100 to start sleep mode by sending a sleep response (MOB_SLP-RSP) message without receiving a sleep request message from the MS 100, which is called an unsolicited manner. Upon reception of the MOB_SLP-RSP message, the MS 100 goes to sleep mode at the beginning frame M of the initial sleep interval, and the sleep mode lasts for the length of the initial sleep interval N1. After the sleep interval, the MS 100 enters a listening interval with a length of L.

During the listening interval, the BS 120 transmits a message instructing the MS 100 to switch to access mode if there is any downlink data destined for the MS 100, whereas the BS 120 transmits a message instructing to remain in sleep mode to the MS 100 if there is no downlink data.

Subsequently, during the listening interval right after the initial sleep interval, the BS 120 transmits a traffic indication (MOB_TRF-IND) message with negative indication for the MS 100 since the BS 120 has decided there is no downlink data for the MS 100 in step S145. This MOB_TRF-IND message with negative indication does not require the identification of the MS 100 and the MS 100 having received this message continues its sleep mode. The length of the next sleep interval of the MS 100 is 2×N1, which is a double of the length of the previous sleep interval. That is, if a MOB_TRF-IND message contains negative indication for the MS 100, the length of the next sleep interval of the MS 100 doubles the length of the previous sleep interval until it reaches up to a maximum length N2 of the sleep interval. After the sleep interval has ended, the MS 100 enters a listening interval with a length of L. For example, the sleep interval and the listening interval as described above are defined by Power Saving Class of type I in the IEEE 802.16e standard.

Thereafter, if provided with a protocol data unit (PDU) for the MS 100, that is, if the BS 120 determines that there is downlink data intended for the MS 100, it transmits a traffic indication (MOB_TRF-IND) message with positive indication for the MS 100 in step S147. This MOB_TRF-IND message with positive indication has the identification of the MS 100. The MS 100 having received this message switches to access mode, thereby receiving the downlink data.

In the wireless communication networks, while the BS and the MS perform normal operations in access mode for data transmission or reception, they may enter sleep mode by minimizing the data transmission or reception in order to save power, thereby reducing power consumption of the MS.

The method for controlling sleep mode described above by referring to FIG. 1 is called the binary exponential algorithm. This algorithm is known to be adequate for a packet-by-packet service, which stores data as a unit of packet in a buffer of the BS and transmits packets to mobile subscribers.

FIG. 2A shows a configuration of sleep mode when the IEEE 802.16e communication system employs the binary exponential algorithm, whereas FIG. 2S shows a configuration of sleep mode when the IEEE 802.16m communication system employs the binary exponential algorithm. In the IEEE 802.16e communication system as shown FIG. 2A, the length of each listening interval L is identical, whereas if there is no downlink data intended for the MS 100, then the length of a sleep interval So is doubled to $S_1$ and $S_1$ is doubled to $S_2$, and so on. In the IEEE 802.16m communication system as shown FIG. 2B, an initial sleep cycle $C_0$ consisting of a sleep interval is extended twice to the next sleep cycle $C_1$ consisting of a listening interval L and a sleep interval S. If there is no downlink data intended for the MS 100, then $C_1$ is extended to $C_2$, and so on. If there is any downlink data intended for the MS 100, then during the listening interval, the data can be delivered to the MS 100.

In recent years, the communication systems have been developed to provide a high data rate service and have operated a scheduler to transmit multiple (bulk) packets or variable length packets to an MS at a time.

However, if the conventional binary exponential algorithm is applied to these latest communication systems, power efficiency achieved by the sleep mode is reduced since transitions between access mode and sleep mode are unnecessarily frequent, it may degrade overall performance of the wireless communication systems.

SUMMARY OF THE INVENTION

The present invention has been conceived to solve the problems described above and it is, therefore, an object of the present invention to provide a method and an apparatus for maximizing power saving by lengthening sleep duration through adoption of the N-ary exponential sleep mode of a BS and an MS in the wireless communication network, where N is set to be equal to or greater than 2, and in particular, if N=2 then it corresponds to the conventional binary exponential sleep mode.

In accordance with an aspect of the prevent invention, there is provided a method for controlling sleep mode of a base station and a mobile station in wireless communication networks. The method includes: determining N of the N-ary exponential sleep mode to decide a length of sleep duration including a sleep interval, where N is equal to or greater than 2; measuring the amount of downlink traffic addressed to the mobile station at the beginning of a listening interval right after the sleep interval; when there exist downlink traffic but m times additional consecutive sleep duration is not expired, confirming whether the measured amount of the downlink traffic satisfies a mode transition condition; conducting a sleep interval of the next sleep duration of which the length is determined by multiplying the length of the current sleep duration by N unless the measured amount of the downlink traffic satisfies the mode transition condition; and transmitting the downlink traffic to the mobile station when m times the additional consecutive sleep duration is expired or when the measured amount of the downlink traffic satisfies the mode transition condition even when m times the additional consecutive sleep duration is not expired.

In accordance with another aspect of the present invention, there is provided an apparatus for controlling sleep mode of a mobile station in a wireless communication network, including: an N-value decision unit for determining N of the N-ary exponential sleep mode to decide a length of sleep duration including a sleep interval, where N is equal to or greater than 2; a traffic measuring unit for measuring an amount of downlink traffic for the mobile station stored in a buffer at the beginning of a listening interval right after the sleep interval; a mode transition determination unit for determining the mode transition by confirming whether the measured amount of the downlink traffic satisfies a mode transition condition when there exist downlink traffic but m times additional consecutive sleep duration is not expired; a sleep duration managing unit for conducting a sleep interval of the next sleep duration, the length of the next sleep duration being determined by multiplying the length of the current sleep duration by N based on the determination of the mode transition determination unit; and a packet control unit for transmitting the downlink traffic to the mobile station when m times the additional consecutive sleep duration is expired or according to the determination of the mode transition determination unit even when m times the additional consecutive sleep duration is not expired.

BRIEF DESCRIPTION OF THE DRAWINGS

The above and other objects and features of the present invention will become apparent from the following description of embodiments given in conjunction with the accompanying drawings, in which:

FIG. 1 is a signal flow chart for illustrating the operation for controlling sleep mode in a communication system;

DETAILED DESCRIPTION OF THE EMBODIMENTS

Hereinafter, embodiments of the present invention will be described in detail with reference to the accompanying drawings which form a part hereof.

The present invention provides a method and an apparatus for controlling sleep mode of a BS and an MS in a wireless communication network. Although the present invention is described with a wireless communication system based on the IEEE 802.16e standard and a wireless system based on the IEEE 802.16m standard, the method and the apparatus of the present invention can be applied to other communication systems. Furthermore, although the present invention is described with a BS and a single MS, the method and the apparatus of the present invention can be applied to multiple MSs as well.

Hereinafter, embodiments of the present invention will be described with reference to the accompanying drawings.

Figure 3:
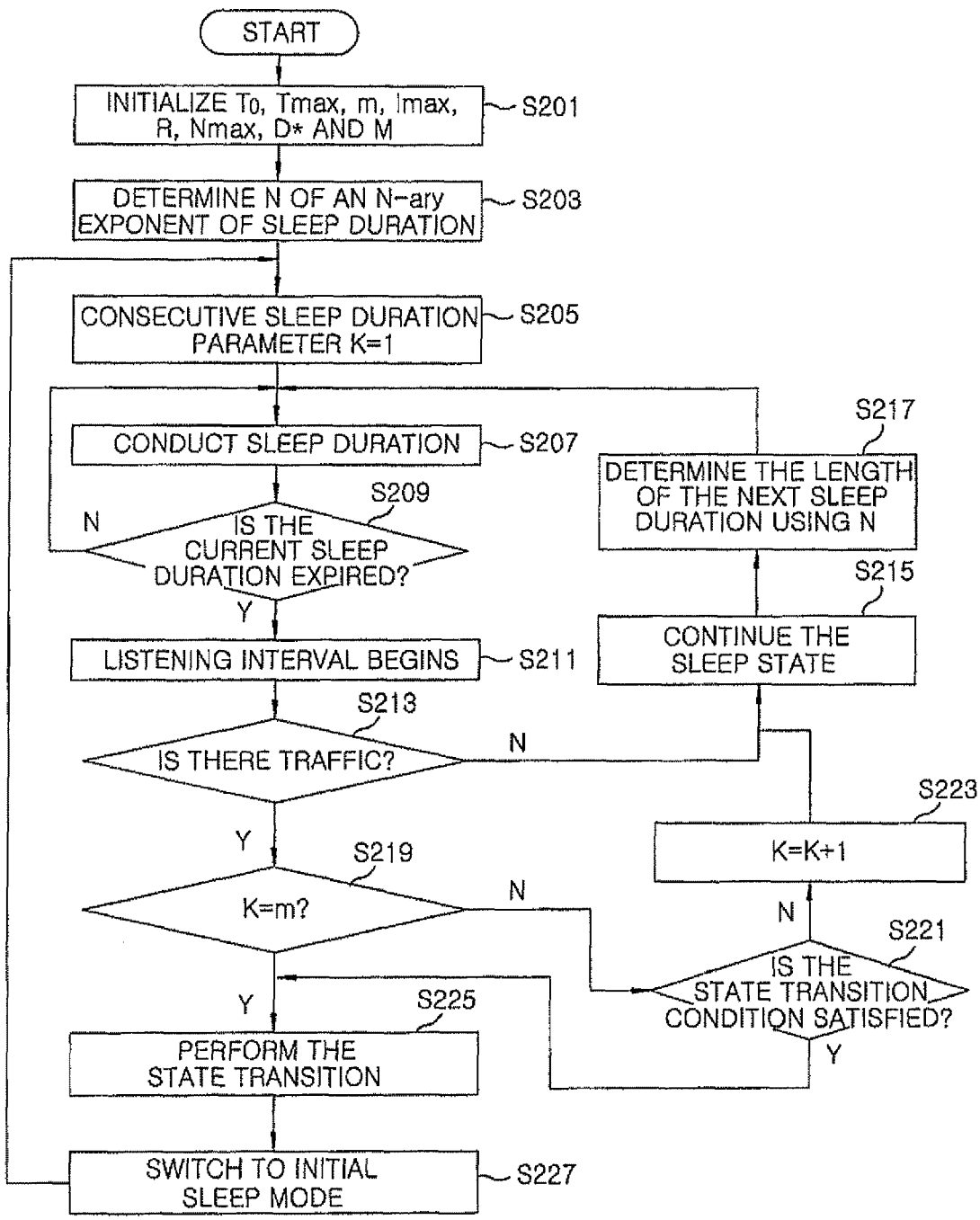
FIG. 3 is a flow chart describing a method for controlling sleep mode in accordance with the first embodiment of the present invention.

FIG. 3 is a flow chart describing a method for controlling sleep mode in a wireless communication network in accordance with the first embodiment of the present invention.

Figure 2A:
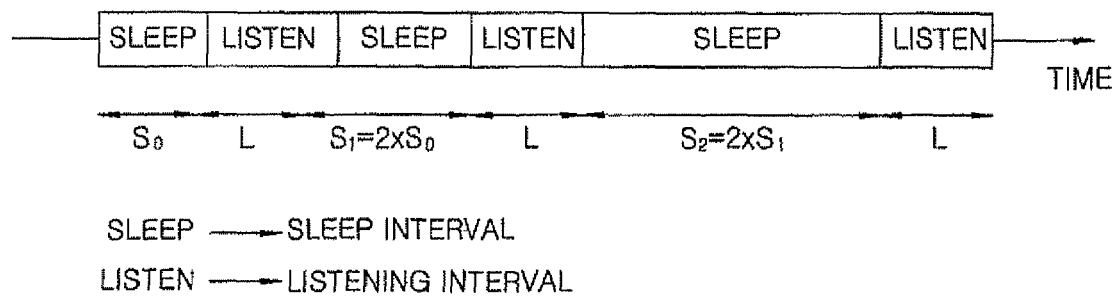
FIG. 2A presents a configuration of sleep mode when the binary exponential algorithm is applied to a communication system based on the IEEE 802.16e standard.
Figure 2B:
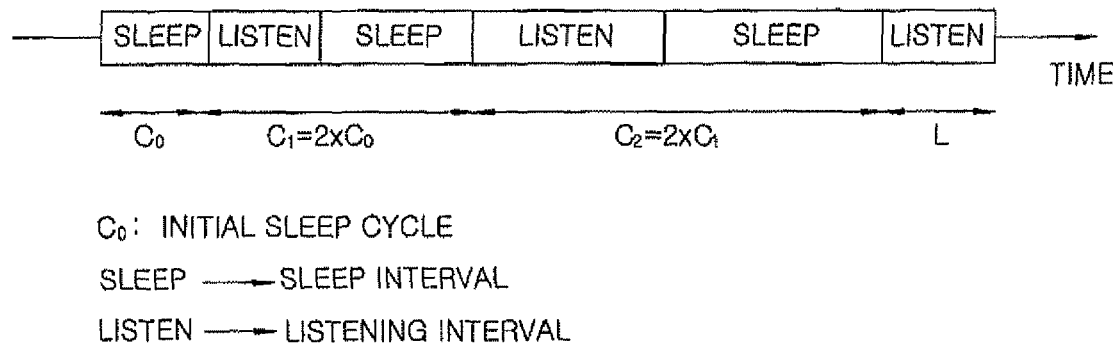
FIG. 2B shows a configuration of sleep mode when the binary exponential algorithm is applied to a communication system based on the IEEE 802.16m standard.

First, in step S201, a BS and an MS 700 determine various parameters necessary for the mode transition operation. For example, a length of initial sleep duration $T_0$, the length of the maximum sleep duration $T_{max}$, the number of additional consecutive sleep duration m upon arrival of packets, the maximum N-ary exponent $I_{max}$, the length of a time-out for retransmission R, the maximum number of allowed retransmissions $N_{max}$, the required transmission delay constraint $D^*$ and the size of multiple packets M can be determined. Here, the length of the sleep duration corresponds to the length of each sleep interval $S_0$, $S_1$ or $S_2$ in the wireless communication system based on the IEEE 802.16e standard shown in FIG. 2A, whereas it corresponds to the length of each sleep cycle $C_0$, $C_1$ or $C_2$ in the wireless communication system based on the IEEE 802.16m standard shown in FIG. 2B.

That is, the sleep duration means sleep mode with a variable length such as a sleep interval or a sleep cycle in wireless communication systems based on various standards. The above parameters can be determined by a sleep request (MOB_SLP-REQ) message and a sleep response (MOB_SLP-RSP) message exchanged between the BS and the MS. For example, if the MS transmits a sleep request MOB_SLP-REQ message to the BS for the mode transition operation, the BS determines whether to approve transition to sleep mode by using variables contained in the MOB_SLP-REQ message and then transmits a sleep response (MOB_SLP-RSP) message with the decision to the MS, or not. Otherwise, the BS transmits a sleep response (MOB_SLP-RSP) message to the MS in an unsolicited manner. This transmitted message contains both parameters of step S201 and N determined as follows.

After that, in step S203, N of the N-ary exponent for the sleep duration is determined using the various parameters. N is used to decide the length of the next sleep duration by multiplying the current sleep duration by N.

The value of N needs to be determined to minimize power consumption as well as to satisfy the quality of service for transmission delay constraint. For this, N satisfying the following Equation 1 is chosen.

$$(m \times N^{I_{max}} T_0) + (N_{max} \times R) \leq D^* \qquad \text{Eq. 1}$$

In Equation 1, m is the number of the additional consecutive sleep duration upon arrival of packets, $I_{max}$ is the maximum N-ary exponent, $T_0$ is the length of the initial sleep duration, $N_{max}$ is the maximum number of allowed retransmissions, R is the length of a time-out for retransmission, and D* is the transmission delay constraint. Here, by collecting packets which arrived during m times the maximum sleep duration determined under the worst-case delay constraint and sending the multiple packets to the MS in downlink, the MS continues its sleep mode for m-times longer sleep duration, thereby saving extra power.

Next, in step S205, the consecutive sleep duration parameter K is initialized to 1.

The sleep duration with a length determined above is proceeded in step S207. Initially, the sleep duration is set to $T_0$. During the sleep duration, the ES does not send downlink data to the MS. If the wireless communication network provides any protocol data unit for the MS during the sleep duration, the BS stores downlink traffic for the MS in a buffer.

Thereafter, in step S209, whether the current sleep duration has expired or not is determined. When the sleep duration with a length determined above is not expired, then the sleep duration continues and the process described above is repeated.

When the sleep duration has expired, then a listening interval begins in step S211.

Next, n step S213, the existence of downlink traffic for the MS stored in the buffer is checked when the listening interval starts. When there is no traffic, the method goes to step S215 where the ES transmits the MS a traffic indication message with negative indication for the MS to conduct the sleep duration.

Subsequently, in step S217, the length of the next sleep duration is determined right after the current listening interval. The length of the next sleep duration is decided by using N determined as in step S203. When the maximum exponent is greater than $I_{max}$, it is fixed to $I_{max}$. As shown in Equation 2, the length of the next sleep duration $T_{next}$ is determined by multiplying the length of the current sleep duration $T_{cur}$ by N. Here, the length of the next sleep duration $T_{next}$ is limited to the length of the maximum sleep duration $T_{max}$.

$$T_{next} = N \times T_{cur}, \text{ where } T_{next} \leq T_{max} \qquad \text{Eq. 2}$$

After the length of the next sleep duration $T_{next}$ is decided in step S217, the method returns to step S207 in which the next sleep duration $T_{next}$ is proceeded.

On the other hand, if the BS has decided that there is traffic in step S213, then it is checked, in step S219, whether or not the consecutive sleep duration parameter K reaches to the number of additional consecutive sleep duration m.

If K does not reach to m, in step S221, whether or not the amount of the measured downlink traffic satisfies the mode transition condition is decided. Here, either whether the number of downlink data packets satisfies the mode transition condition or whether the amount of downlink data satisfies the mode transition condition can be adopted.

As for whether the number of downlink data packets satisfies the mode transition condition or not, the following Equation 3 is used for decision making.

$$N_{pkt} \geq M \qquad \text{Eq. 3}$$

In Equation 3, $N_{pkt}$ is the number of the packets stored in the buffer and M is the threshold value representing the maximum number of packets allowed for one-time downlink transmission.

As for whether the amount of downlink data satisfies the mode transition condition or not, the following Equation 4 is used for decision making.

$$N_{bit} \geq N_{th} \qquad \text{Eq. 4}$$

In Equation 4, $N_{bit}$ is the number of the transmitted bits and $N_{th}$ is a threshold value representing the maximum allowable number of the transmitted bits in a given time.

When the BS determines that the mode transition condition is not satisfied in step S221, the BS increases K by 1 in step S223 and then transmits the MS a traffic indication message with negative indication for the MS to conduct the sleep duration in step S215.

On the other hand, if K reaches to m in step S219, the BS transmits the MS a traffic indication message with positive indication for the MS for the mode transition and transmits the downlink data stored in the buffer to the MS in step S225 and then it switches to initial sleep mode I step S227.

Although not shown in FIG. 3, if there is uplink data from the MS after the BS transmits the downlink data stored in the buffer to the MS, the BS may receive the uplink data from MS. When the BS transmits the MS the downlink data stored in the buffer, the parameter M or the threshold value Nth of the maximum allowable number of transmitted bits may be fixed, varied or unlimited. In case of the fixed or varied value, data conforming to the amount of data bits or the number of data packets assigned to the MS is transmitted. In case of the unlimited value, all of the stored downlink traffic is transmitted.

Further, although not shown in FIG. 3, a time-out can follow after the data transmission or reception is completed.

Figure 4:
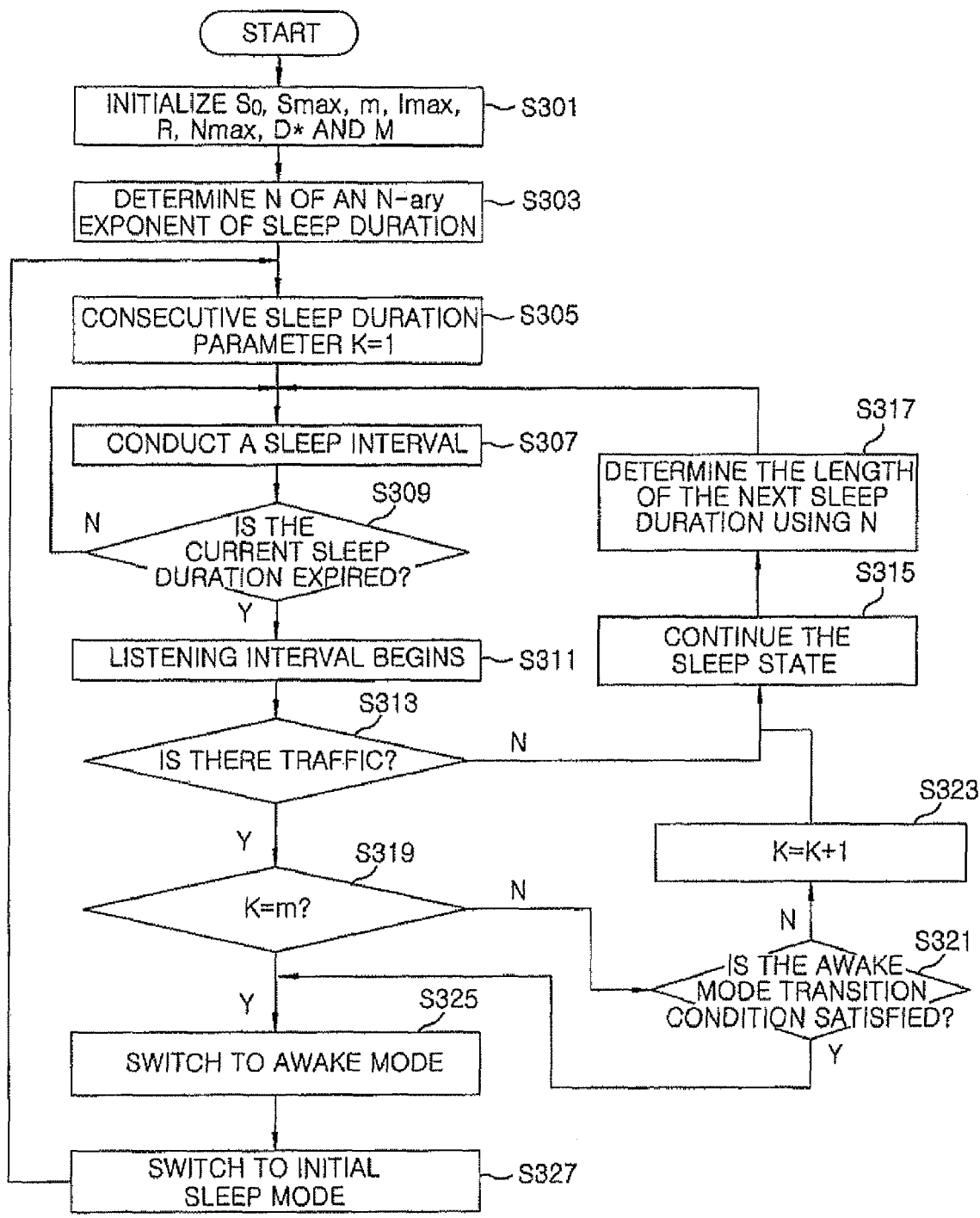
FIG. 4 shows a flow chart describing a method for controlling sleep mode in accordance with the second embodiment of the present invention.

FIG. 4 is a flow chart describing a method for controlling sleep mode in a wireless communication network in accordance with the second embodiment of the present invention when a wireless communication system based on the IEEE 802.16e standard is employed.

First, in step S301, a BS and an MS determine various parameters required for the mode transition operation. For example, the length of an initial sleep interval $S_0$, the length of the maximum sleep interval $S_{max}$, the number of additional consecutive sleep intervals m upon arrival of packets, the maximum N-ary exponent $I_{max}$, the length of a time-out for retransmissions R, the maximum number of allowed retransmissions $N_{max}$, the required transmission delay constraint D* and the threshold value M for the maximum number of packets allowed for one-time downlink transmission can be determined.

The above parameters can be determined by a sleep request (MOB_SLP-REQ) message and a sleep response (MOB_SLP-RSP) message exchanged between the BS and the MS. For example, if the MS transmits a sleep request MOB_SLP-REQ message to the BS for the mode transition operation, the BS determines whether to approve transition to sleep mode by using variables contained in the MOB_SLP-REQ message and then transmits a sleep response (MOB_SLP-RSP) message with the decision to the MS. Otherwise, the BS transmits a sleep response (MOB_SLP-RSP) message to the MS in an unsolicited manner. This transmitted message contains both parameters determined in step S301 and N determined in step S303 as follows.

In step S303, N of the N-ary exponent for the sleep interval is determined using the various parameters. N is used to determine the length of the next sleep interval by multiplying_the current sleep interval by N. N needs to be determined to minimize power consumption as well as to satisfy the quality of service for a given transmission delay constraint. For this, N satisfying the following Equation 5 is chosen.

$$(m \times N^{I_{max}} S_0) + (N_{max} \times R) \leq D^* \quad \text{Eq. 5}$$

In Equation 5, m is the number of the additional consecutive sleep interval upon arrival of packets, $I_{max}$ is the maximum N-ary exponent, So is the length of an initial sleep interval, $N_{max}$ is the maximum number of allowed retransmissions, R is the length of a time-out for retransmission, and D* is the required transmission delay constraint.

Next, the consecutive sleep interval parameter K is initialized to 1 in step S305 and then the sleep interval with a length determined above begins in step S307.

Initially, the sleep interval is set with $S_0$. During the sleep interval, the BS does not send downlink data to the MS. If the wireless communication network provides any protocol data unit for the MS during the sleep interval, the BS stores downlink traffic for the MS in a buffer.

Thereafter, in step S309, whether the current sleep interval has expired or not is determined. When the frames do not reach up to the sleep interval with a length determined above, then the method returns to step S307 to continue the sleep interval and repeat the process described above.

However, when the current sleep duration has expired, then a listening interval starts in step S311.

Next, in step S313, the existence of downlink traffic for the MS stored in the buffer is checked when the listening interval begins. If there is no traffic, in step S315, the BS transmits the MS a traffic indication message with negative indication for the MS to conduct the sleep interval.

The length of the next sleep interval is determined following right after the current listening interval. The length of the next sleep interval is decided by using N determined in step S303. When the maximum exponent is greater than $I_{max}$, it is fixed to $I_{max}$. As shown in Equation 6, the length of the next sleep interval $S_{next}$ is determined by multiplying the length of the current sleep interval $S_{cur}$ by N. Here, the length of the next sleep interval $S_{next}$ is limited to the length of the maximum sleep interval $S_{max}$.

$$S_{next} = N \times S_{cur}, \text{ where } S_{next} \leq S_{max} \quad \text{Eq. 6}$$

After that, in step S317, the length of the next sleep interval $S_{next}$ is decided, and the method returns to step S307 to start the next sleep interval $S_{next}$.

On the other hand, however, if the ES has decided that there is traffic in step S313, then it checks whether or not the consecutive sleep interval parameter K reaches to the number of additional consecutive sleep intervals m in step S319.

When K does not reach to m, whether or not the amount of the measured downlink traffic satisfies the access mode transition condition is decided in step S321. Here, either whether the number of downlink data packets satisfies the access mode transition condition or whether the amount of downlink data satisfies the access mode transition condition can be adopted.

As for whether the number of downlink data packets satisfies the access mode transition condition, the following Equation 7 is used for decision making.

$$N_{pkt} \geq M \quad \text{Eq. 7}$$

In the Equation 7, $N_{pkt}$ is the number of the packets stored in the buffer and M is the threshold value requesting the maximum number of packets allowed for one-time downlink transmission.

As for whether the amount of downlink data satisfies the access mode transition condition, the following Equation 8 is used for decision making.

$$N_{bit} \geq N_{th} \quad \text{Eq. 8}$$

In the Equation 8, $N_{bit}$ is the number of the transmitted bits and $N_{th}$ is a threshold value for the maximum allowable number of transmitted bits in a given time.

When the BS determines that the access mode transition condition is not satisfied in step S321, the BS increases K by 1 in step S323 and then transmits the MS a traffic indication message with negative indication for the MS to conduct the sleep interval in step S315.

On the other hand, when K reaches to m in step S319, the BS transmits the MS a traffic indication message with positive indication for the MS for the mode transition to access mode and transmits the downlink data stored in the buffer to the MS in step S325.

After completing the transmission of the downlink data, the BS switches to initial sleep mode in step S327 and goes back to step S305.

Although not shown in FIG. 4, if there is uplink data from the MS after the BS transmits the downlink data stored in the buffer to the MS, the BS may receive the uplink data from MS. When the BS transmits the MS the downlink data stored in the buffer, the parameter value of M or the threshold value Nth for the maximum allowable number of transmitted bits can be fixed, varied or unlimited. In case of the fixed or varied value, data conforming to the amount of data bits or the number of packets assigned to the MS is transmitted. In case of the unlimited value, all of the measured downlink traffic is transmitted.

Although not shown in FIG. 4, a time-out can follow after the transmission and reception of data is completed.

Figure 5:
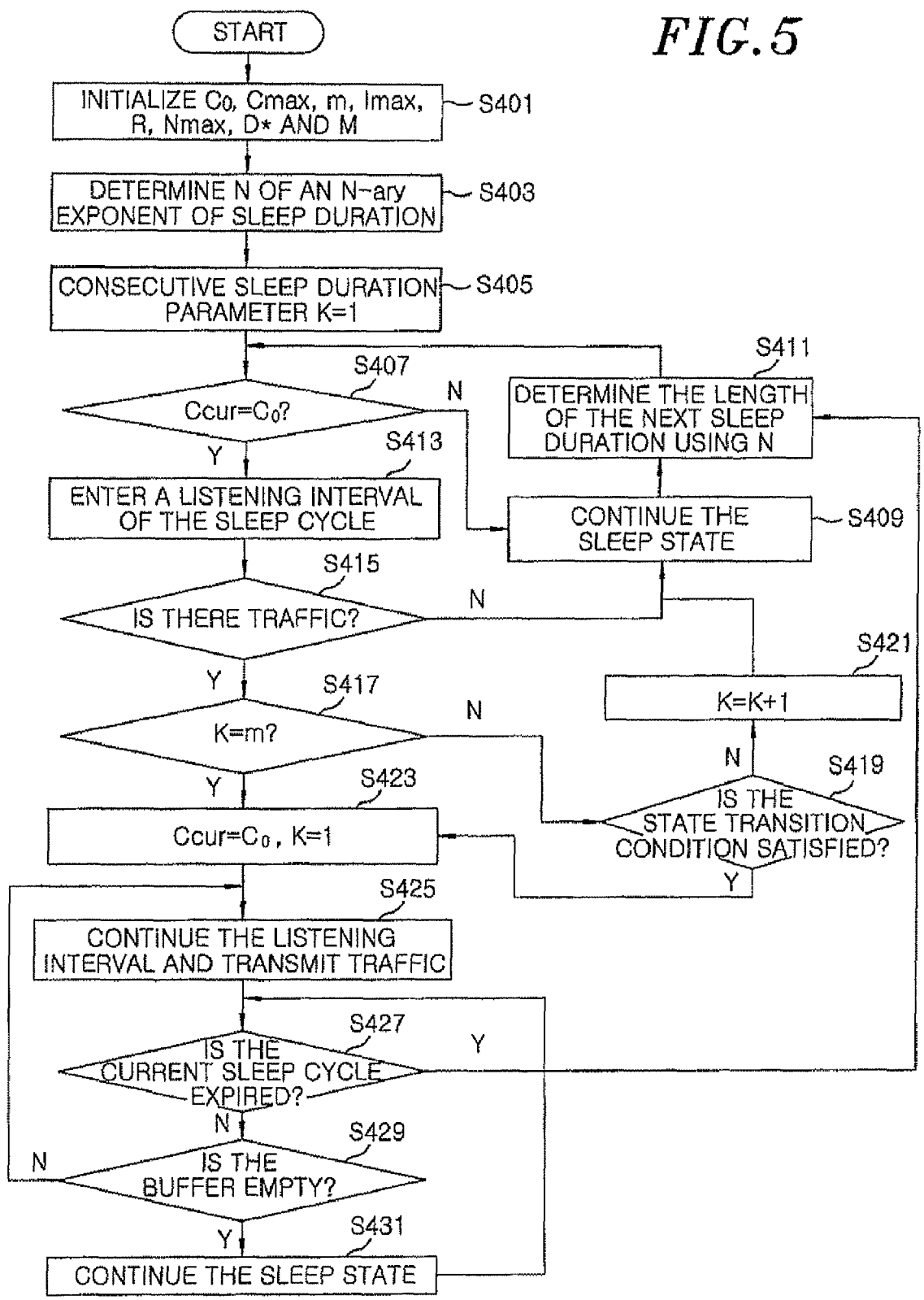
FIG. 5 is a flow chart describing a method for controlling sleep mode in accordance with the third embodiment of the present invention.

FIG. 5 is a flow chart describing a method for controlling sleep mode a wireless communication network in accordance with the third embodiment of the present invention when a wireless communication system based on the IEEE 802.16m standard is employed.

First, in step S401, a BS and an MS determine various parameters required for the mode transition operation. For example, the length of an initial sleep cycle Co, the length of the maximum sleep cycle $C_{max}$, the number of additional consecutive sleep cycles m upon arrival of packets, the maximum Nary exponent $I_{max}$, the length of a time-out for retransmission R, the maximum number of allowed retransmissions $N_{max}$, the required transmission delay constraint D* and the threshold value M for the maximum number of packets allowed for one-time downlink transmission can be determined.

The above parameters can be determined by a sleep request (MOB_SLP-REQ) message and a sleep response (MOB_SLP-RSP) message exchanged between the BS and the MS. For example, if the MS transmits a sleep request MOB_SLP-REQ message to the BS for the mode transition operation to sleep mode, the BS determines whether to approve transition to sleep mode by using variables contained in the MOB_SIP-REQ message and then transmits a sleep response (MOB_SLP-RSP) message with the decision to the MS. Otherwise, the BS transmits a sleep response (MOB_SLP-RSP) message to the MS in an unsolicited manner. This transmitted message contains both parameters of step S401 and N determined as follows.

In step S403, N of the N-ary exponent for the sleep cycle is determined by using the various parameters. N is used to decide the length of the next sleep cycle by multiplying the current sleep cycle by N. The value of N needs to be determined to minimize power consumption as well as to satisfy the quality of service for q given transmission delay constraint. For this, N satisfying the following Equation 9 is chosen (S403).

$$(m \times N^{I_{max}} C_0) + (N_{max} \times R) \leq D^* \qquad \text{Eq. 9}$$

In Equation 9, m is the number of the additional consecutive sleep cycle upon arrival of packets, $I_{max}$ is the maximum N-ary exponent, $C_0$ is the length of initial sleep cycle, $N_{max}$ is the maximum number of allowed retransmissions, R is the length of a time-out for retransmission, and $D^*$ is the required transmission delay constraint.

Next, the consecutive sleep cycle parameter K is initialized to 1 in step S405 and then whether or not the previously determined sleep cycle is the initial sleep cycle is checked in step S407. Initially, the sleep cycle is set with $C_0$.

When the sleep cycle is the initial sleep cycle, in step S409, the sleep mode lasts until the sleep cycle is expired. During the sleep mode, downlink data is not sent to the MS from the BS. When the wireless communication network provides any protocol data unit for the MS during the sleep mode, the BS stores downlink traffic for the MS in a buffer.

Thereafter, the length of the next sleep cycle is determined. The length of the next sleep cycle is decided by using N determined as in step S403. When the maximum exponent is greater than $I_{max}$, it is fixed to $I_{max}$. As shown in the Equation 10, the length of the next sleep cycle $C_{next}$ is determined by multiplying the length of the current sleep cycle $C_{cur}$ by N. Here, the length of the next sleep cycle $C_{next}$ is limited to the length of the maximum sleep cycle $C_{max}$ as follows.

$$C_{next} = N \times C_{cur}, \text{ where } C_{next} \leq C_{max} \qquad \text{Eq. 10}$$

Accordingly, the length of the next sleep cycle $C_{next}$ is determined in step S411.

Meanwhile, when the sleep cycle is not the initial sleep cycle, in step S413, a listening interval of the sleep cycle begins. In this step, a single frame is used for the listening interval.

Next, in step S415, the existence of downlink traffic for the MS stored in the buffer is checked when the listening interval starts. When there is no traffic, the method returns to step S409 where the BS transmits the MS a traffic indication message with negative indication for the MS to conduct the sleep duration.

On the other hand, however, when the BS has detected that there is traffic in step S415, then it checks whether or not the consecutive sleep cycle parameter K reaches to the number of additional consecutive sleep cycle m in step S417.

When K does not reach to m, in step S419, whether or not the amount of the measured downlink traffic satisfies the access mode transition condition is decided. Here, either whether the number of downlink data packets satisfies the access mode transition condition or whether the amount of downlink data satisfies the access mode transition condition can be adopted.

As for whether the number of downlink data packets satisfies the access mode transition condition, the following Equation 11 is used for decision making.

$$N_{pkt} \geq M \qquad \text{Eq. 11}$$

In Equation 11, $N_{pkt}$ is the number of the packets stored in the buffer and M is the threshold value requesting the maximum number of packets allowed for one-time downlink transmission.

As for whether the amount of downlink data satisfies the access mode transition condition, the following Equation 12 is used for decision making.

$$N_{bit} \geq N_{th} \qquad \text{Eq. 12}$$

In Equation 12, $N_{bit}$ is the number of the transmitted bits and $N_{th}$ is a threshold value for the maximum allowable number of the transmitted bits in a given time.

When the BS determines that the access mode transition condition is not satisfied in step S419, the BS increases K by 1 in step S421 and then transmits the MS a traffic indication message with negative indication for the MS to conduct the sleep mode in step S409.

On the other hand, when K reaches to m in step S417 or if the mode transition condition is satisfied in step S419, the method advances to step S423. In step S423, the BS transmits the MS a traffic indication message with positive indication for the MS for traffic transmission. Then, the BS sets the length of the current sleep cycle $C_{cur}$ to the length of the initial sleep cycle $C_0$ and then initializes the consecutive sleep cycle parameter to 1. Next, in step S425, while keeping the listening interval, the BS transmits the downlink data stored in the buffer to the MS. When the BS transmits the MS the downlink data stored in the buffer, the parameter value of M or the threshold value Nth for the maximum allowable number of transmitted bits can be fixed, varied or unlimited. In case of the fixed or varied value, data conforming to the amount of data bits or the number of packets assigned to the MS is transmitted. In case of the unlimited value, all of the measured downlink traffic is transmitted.

Then, in step S427, whether or not the current sleep cycle including the listening interval of step S425 is expired is decided.

When the current sleep cycle has expired in step S427, then the method returns to step S411 where the length of the next sleep cycle is determined. When the current sleep cycle has not expired, whether or not the buffer is empty is then checked in step S429. The listening interval of the current sleep cycle lasts until the buffer is completely emptied. When the buffer is emptied, the sleep mode continues until the current sleep cycle ends in step S431.

Figure 6:
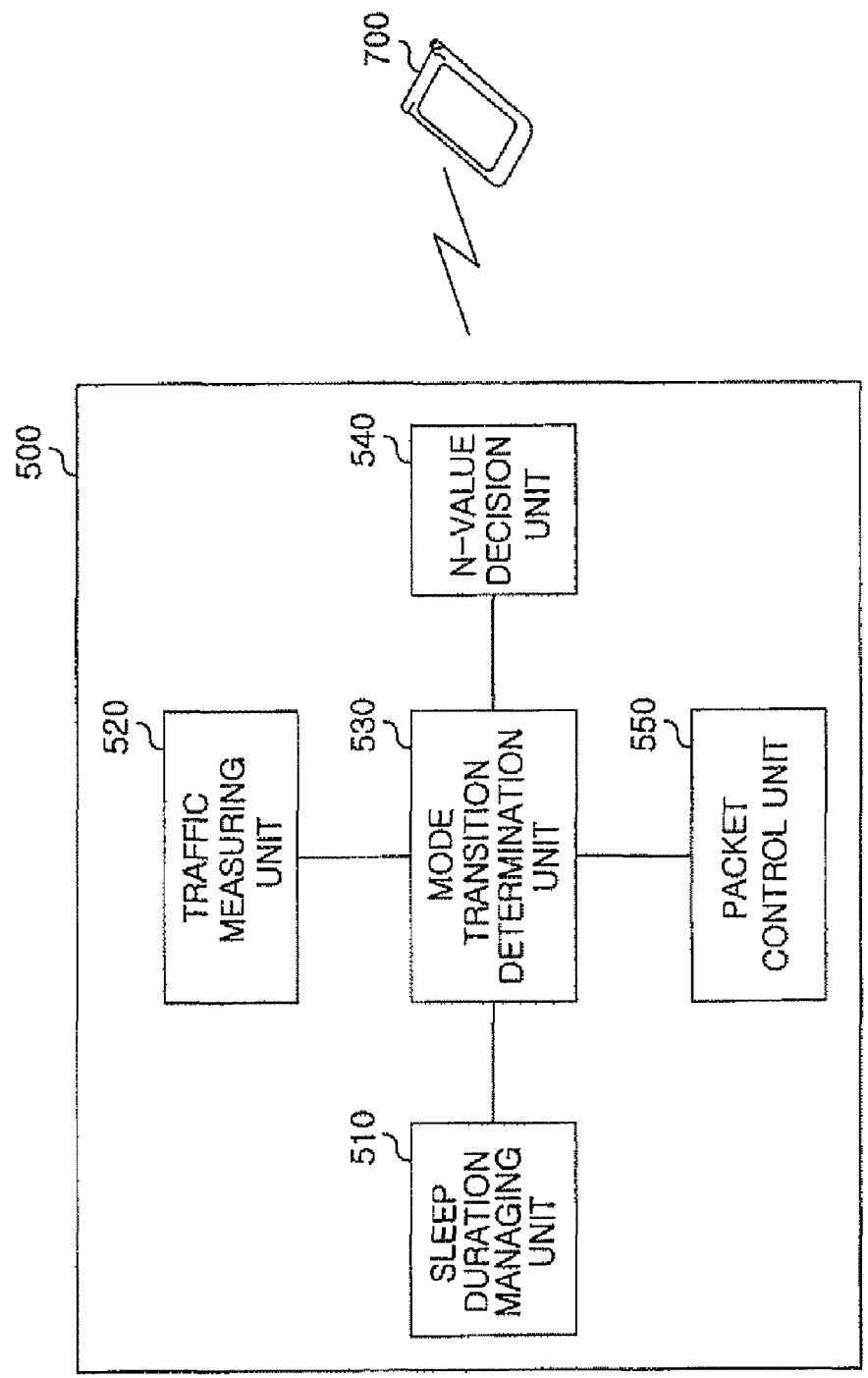
FIG. 6 illustrates a block diagram of a sleep mode controlling apparatus provided in a base station for performing methods for controlling sleep mode in accordance with the embodiments of the present invention.

FIG. 6 as a block diagram of a sleep mode control apparatus 500 provided in a BS for implementing methods for controlling sleep mode in accordance with the embodiments of the present invention.

As shown in FIG. 6, a sleep mode controlling unit 500 includes a sleep duration managing unit 510, a traffic measuring unit 520, a mode transition determination unit 530, an N-value decision unit 540 and a packet control unit 550.

The sleep duration managing unit 510 determines the length of sleep duration in sleep mode to enter and then conducts a sleep interval of the sleep duration. The sleep duration managing unit 510 stores downlink traffic for an MS 700 in the buffer if a protocol data unit for the MS 700 is provided from a wireless communication network. The sleep duration managing unit 510 conducts a listening interval when the current sleep interval has expired. Here, the sleep duration managing unit 510 determines the length of the next sleep duration by multiplying the length of the current sleep duration by N provided from the N-value decision unit 540.

The traffic measuring unit 520 measures the amount of the downlink traffic for the MS 700 stored in the buffer at the beginning of the listening interval. As described above, the amount of the downlink traffic for the MS 700 can be measured in terms of the number of downlink data packets or the amount of downlink data bits, e.g., the number of data bits, addressed to the MS 700 stored in the buffer at the beginning of the listening interval. Upon arrival of packets, extending the current sleep duration by up to m times allows more packets to arrive.

The mode transition determination unit 530 determines whether or not to send a traffic indication message with positive indication or to send a traffic indication message with negative indication based on either the measured amount of the downlink traffic or reaching the number of the additional consecutive sleep duration m. For example, when the measured amount of the downlink traffic does not satisfy the mode transition condition, the mode transition determination unit 530 transmits the MS 700 a traffic indication message with negative indication for the MS 700 during a listening interval so that the MS 700 can enter a sleep interval. On the other hand, when the measured amount of the downlink traffic satisfies the mode transition condition or when the number of the additional consecutive sleep duration m has been reached, the mode transition determination unit 530 transmits the MS 700 a traffic indication message with positive indication for the MS 700 during a listening interval to manage mode transition such as packet transmission.

The N-value decision unit 540 determines N of the sleep duration by using various parameters required for the mode transition operation and provides it to the sleep duration managing unit 510. Here, N can be sent to the sleep duration managing unit 510 either directly or via the mode transition determination unit 530. N is used to determine the length of the next sleep duration by multiplying the length of the current sleep duration by N and it needs to minimize power consumption as well as to satisfy the quality of service for a given transmission delay constraint. For this, the length of the initial sleep duration, the number of the additional consecutive sleep duration, the maximum N-ary exponent, the maximum allowable number of retransmissions, the length of a time-out for retransmission and the transmission delay constraint are considered to determine N. Here, these various parameters requi8red for the mode transition operation can be determined by a sleep request message and a sleep response message exchanged between the BS and the MS 700.

The packet control unit 550 performs the following operation in sleep mode or access mode. The packet control unit 550 controls the BS to transmit the downlink data stored in the buffer to the MS 700. When there is uplink data from the MS 700, the packet control unit 550 controls the BS to receive the uplink data from the MS 700 and when the transmission and reception of the data is completed, it conducts a time-out as described above.

The sleep mode controlling apparatus 500 performs the methods for controlling sleep mode described with respect to the embodiments described by referring to FIGS. 3 to 5. A detailed description thereof will be omitted to avoid redundancy since it can be readily implemented by those skilled in the art by using the description referring to FIGS. 3 to 5.

In accordance with the embodiments of the present invention, power consumption due to too frequent mode transition caused when the wireless communication network supports sleep mode of the BS and MS can be reduced. Power saving can be significantly increased by lengthening a sleep cycle through adoption of the N-ary exponential sleep mode considering a multiple packet transmission technique as well as satisfying the required delay constraint for each service flow, where N is set to be equal to or greater than 2. In particular, if N=2 then it corresponds to the conventional binary exponential sleep mode.

Furthermore, power consumption of the MS can be reduced without hardware modification in broadband wireless access communication systems based on the IEEE 802.16e and 802.16m standards.

While the invention has been shown and described with respect to the embodiments, it will be understood by those skilled in the art that various changes and modifications may be made without departing from the spirit and scope of the invention as defined in the following claims.

What is claimed is:

1. A method for controlling sleep mode of a mobile station, the method comprising: determining N of the N-ary exponential sleep mode to decide a length of a sleep duration including a sleep interval, wherein N is equal to or greater than 2; measuring the amount of downlink traffic addressed to the mobile station at the beginning of a listening interval right after the sleep interval; when there exist downlink traffic but m times, wherein m is greater than zero, additional consecutive sleep duration is not expired, confirming whether the measured amount of the downlink traffic satisfies a mode transition condition; conducting a sleep interval of a next sleep duration of which the length is determined by multiplying the length of a current sleep duration by the N unless the measured amount of the downlink traffic satisfies the mode transition condition; and transmitting the downlink traffic to the mobile station when the m times the additional consecutive sleep duration is expired or when the measured amount of the downlink traffic satisfies the mode transition condition even when the m times the additional consecutive sleep duration is not expired.

2. The method of claim 1, wherein said N of the N-ary exponential sleep mode is determined by using a length of an initial sleep duration, the number of the additional consecutive sleep duration, a maximum N-ary exponent, a length of a time-out for retransmission, the maximum allowable number of retransmissions or the combination thereof.

3. The method of claim 1, wherein, the mode transition condition includes a condition in which the number of packets is greater than or equal to the maximum number of packets allowed for one-time downlink transmission as a threshold value.

4. The method of claim 3, wherein the maximum number of the packets is fixed, varied or unlimited.

5. The method of claim 1, wherein, the mode transition condition includes a condition in which the number of transmitted bits is greater or equal to maximum allowable number of transmitted bits as a threshold value.

6. The method of claim 5, wherein the threshold value of the maximum allowable number of transmitted bits is fixed, varied or unlimited.

7. The method of claim 1, wherein, in said transmitting the downlink traffic, packets that arrived during m times the additional consecutive sleep duration are stored in a buffer and then multiple packets are simultaneously transmitted through the downlink.

8. A non-transitory computer-readable storage medium for storing therein a program for executing the method of claim 1.

9. An apparatus for controlling sleep mode of a mobile station, comprising: a N-value decision unit for determining N of a N-ary exponential sleep mode to decide a length of sleep duration including a sleep interval, wherein N is equal to or greater than 2; a traffic measuring unit for measuring an amount of downlink traffic for the mobile station stored in a buffer at the beginning of a listening interval right after the sleep interval; a mode transition determination unit for determining a mode transition by confirming whether the measured amount of the downlink traffic satisfies the mode transition condition when there exist downlink traffic but m times, wherein m is greater than zero, additional consecutive sleep duration is not expired; a sleep duration managing unit for conducting the sleep interval of next sleep duration, the length of the next sleep duration being determined by multiplying the length of a current sleep duration by N based on the determination of the mode transition determination unit; and a packet control unit for transmitting the downlink traffic to the mobile station when the m times the additional consecutive sleep duration is expired or according to the determination of the mode transition determination unit even when the m times the additional consecutive sleep duration is not expired.

10. The apparatus of claim 9, wherein the N-value decision unit decides N by using a length of an initial sleep duration, the number of the additional consecutive sleep duration, a maximum N-ary exponent, the length of a time-out for retransmission and the maximum allowable number of retransmissions, or the combination thereof.

11. The apparatus of claim 9, wherein the mode transition condition includes a condition in which the number of packets is greater than or equal to the maximum number of packets allowed for one-time downlink transmission as a threshold value.

12. The apparatus of claim 11, wherein the threshold value is fixed, varied or unlimited.

13. The apparatus of claim 9, wherein the mode transition condition includes a condition in which the number of transmitted bits is greater or equal to a maximum allowalble number of transmitted bits as a threshold value.

14. The apparatus of claim 13, wherein the threshold value is fixed, varied or unlimited.

15. The apparatus of claim 9, wherein the packet control unit stores packets that arrived during m times the additional consecutive sleep duration in a buffer and then simultaneously transmits multiple packets through the downlink.

* * * * *